(12) United States Patent
Kiribuchi

(10) Patent No.: US 12,381,496 B2
(45) Date of Patent: Aug. 5, 2025

(54) ENCODER SPECIFYING METHOD AND DRIVER

(71) Applicant: OMRON Corporation, Kyoto (JP)

(72) Inventor: Takeshi Kiribuchi, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 105 days.

(21) Appl. No.: 18/546,476

(22) PCT Filed: Dec. 20, 2021

(86) PCT No.: PCT/JP2021/047134
§ 371 (c)(1),
(2) Date: Aug. 15, 2023

(87) PCT Pub. No.: WO2022/185677
PCT Pub. Date: Sep. 9, 2022

(65) Prior Publication Data
US 2024/0186924 A1   Jun. 6, 2024

(30) Foreign Application Priority Data

Mar. 4, 2021   (JP) ................................. 2021-034733

(51) Int. Cl.
*H02P 8/00* (2006.01)
*H02P 8/34* (2006.01)

(52) U.S. Cl.
CPC ............ *H02P 8/34* (2013.01); *H02P 2205/03* (2013.01)

(58) Field of Classification Search
CPC ...................................... H02P 8/34; H02P 6/08
See application file for complete search history.

(56) References Cited

U.S. PATENT DOCUMENTS 6,963,148 B1 * 11/2005 Faizullabhoy ....... H02K 41/031
318/135

FOREIGN PATENT DOCUMENTS

CN      210109611 U  *  2/2020
CN      111555664 A     8/2020
(Continued)

OTHER PUBLICATIONS

International Search Report issued in Intl. Appln. No. PCT/JP2021/047134 mailed Feb. 8, 2022. English translation provided.
(Continued)

*Primary Examiner* — Karen Masih
(74) *Attorney, Agent, or Firm* — ROSSI, KIMMS & McDOWELL LLP

(57) ABSTRACT

A method for specifying an encoder attached to a motor that is a target of control processing performed by the driver using encoder detection in a predetermined communication state in which the driver is able to communicate with the encoder, and the motor is able to transmit and receive a signal between the encoder and a winding of the motor. The method includes a first step of connecting the driver and the motor by a power line, a second step of transmitting first identification information for identifying a transmission side in the driver and the motor from the transmission side to a reception side through the power line between the driver and the motor connected by the power line, and a third step of specifying the encoder corresponding to the driver with respect to the control processing using at least the first identification information.

7 Claims, 6 Drawing Sheets

(56) References Cited

FOREIGN PATENT DOCUMENTS

| | | |
|---|---|---|
| JP | 2004318439 A | 11/2004 |
| JP | 2009258949 A | 11/2009 |
| JP | 2017175716 A | 9/2017 |
| WO | 2016174755 A1 | 11/2016 |

OTHER PUBLICATIONS

Written Opinion issued in Intl. Appln. No. PCT/JP2021/047134 mailed Feb. 8, 2022. English translation provided.

* cited by examiner

ENCODER SPECIFYING METHOD AND DRIVER

FIELD

The present invention relates to an encoder specifying method and a driver.

BACKGROUND

Recently, a multi-joint robot such as an industrial robot has been actively developed. In many of such robots, a control device controls a plurality of motors such as motors of joints to implement complicated movement. In addition, a plurality of control shafts are generally set in a facility device disposed in a factory or the like, and a large number of motors serving as drive sources are mounted for this purpose. As described above, in the device in which the plurality of motors are mounted, each of the plurality of motors is required to be grasped and then an instruction is issued to each of the motors. Accordingly, when a facility device is constructed, a combination of the control device and the motor that is of a control target is required to be appropriately recognized.

For example, Patent Document 1 discloses a control system that wirelessly controls the plurality of motors in the facility device. In this system, a combination of motor devices that are of the control target can be arbitrarily changed by updating a combination table, and the update of the combination table is executed through a wireless communication interface in the motor device. Furthermore, Patent Document 2 discloses a configuration in which identification information about an encoder that is of a communication target is exchanged on a wired bus. With this configuration, encoder addresses of the plurality of encoders connected through the bus can be easily set to arbitrary encoder addresses.

PRIOR ART DOCUMENT

Patent Documents

Patent Document 1: Japanese Patent Application Laid-Open No. 2017-175716
Patent Document 2: Japanese Patent Application Laid-Open No. 2004-318439

SUMMARY OF THE INVENTION

Problems to be Solved by the Invention

In general, when the plurality of motors are servo-controlled by the control device located upstream, the driver includes a controller related to servo control of the motor and a power converter that supplies drive power to the motor using a calculated value related to the servo control, so that a combination of a driver corresponding to each motor and the motor is required to be appropriately set. When the combination of the driver and the corresponding motor is not appropriately set, a detection signal of the encoder included in the motor is not delivered to the corresponding driver, so that it is difficult to perform servo control on the motor.

At this point, each driver and the encoder of each motor can communicate with an unspecified partner as a state before the plurality of motors are servo-controlled by the control device, but a combination of the driver and the encoder of the motor is not yet determined. For example, when the driver and the encoder of the motor wirelessly communicate with each other, the driver is placed in the state capable of communicating with the unspecified encoder before the encoder of the specific motor corresponding to the driver is specified. Alternatively, even in the case where the control device, the driver, and each encoder perform communication in a daisy-chain connected state like EtherCAT (registered trademark), the driver is placed in the state communicable with the unspecified encoder before the encoder of the specific motor corresponding to the driver is specified. In this way, the control processing using the encoder detection by the driver cannot be implemented in the state where the driver can communicate with the unspecified encoder.

The present invention has been made in view of such a problem, and an object of the present invention is to provide a technique for enabling a driver to start control processing using encoder detection while the driver can communicate with an encoder before specification.

Means for Solving the Problem

According to one aspect of the present invention, a method for specifying an encoder attached to a motor that is a target of control processing by a driver in a predetermined communication state in which the driver and the encoder are communicable, the motor being able to transmit and receive a signal between the encoder and a winding of the motor, the method includes: a first step of connecting the driver and the motor by a power line; a second step of transmitting first identification information for identifying a transmission side in the driver and the motor from the transmission side to a reception side through the power line between the driver and the motor connected by the power line; and a third step of specifying the encoder corresponding to the driver with respect to the control processing using at least the first identification information.

The predetermined communication state is a state in which the driver can communicate with the encoder before the specification processing for the control processing is performed, in other words, a state in which the specific encoder and the driver do not recognize each other and perform communication with each other for the control processing (for example, servo control) using the encoder detection. Consequently, the predetermined communication state represents a state in which a communication state for the control processing using encoder detection is not yet established between the driver and the encoder. The encoder specifying method is a method for reaching the communication state for the control processing using the encoder detection from the predetermined communication state. The predetermined communication state may be a communication state by wireless communication or a communication state formed by the daisy-chain connection of the driver and the encoder.

At this point, the motor is configured such that the signal can be transmitted and received between the encoder and the windings of the motor. In this case, the motor may be a single-phase AC motor or a three-phase AC motor. In addition, the connection state of the coil in a winding unit of the motor may be what is called delta connection or star connection (or Y connection). The winding method of the coil of the winding unit around the stator of the motor may be distributed winding or concentrated winding. That is, in the motor of the present invention, specific formation of the winding unit is not particularly limited. For example, a signal exchange unit that is disposed so as to form a predetermined transformer structure with respect to the winding unit and enables the transmission and the reception of a predetermined signal between the winding unit and the encoder through the predetermined transformer structure may be further included.

In the above method, first, the driver and the motor are connected by the power line. As a result, the communication between the motor and the driver, namely, the communication between the encoder and the driver is implemented by the communication through the power line (for example, the communication through the transmission and the reception of a predetermined signal by the signal exchange unit) in addition to the communication between the driver and the encoder in the predetermined communication state (that is, the communication with an unspecified encoder). The communication through the power line is communication in the state in which the driver and the motor are connected one-to-one by the physical power line, and at this time, a communication partner is practically specified. In view of the technical significance of the communication through the power line, the first identification information is transmitted and received between the driver and the motor in the second step. The first identification information is information for identifying the transmission side.

The side on which the first identification information is received through the power line can accurately identify the other side (transmission side) connected by the power line. In the third step, the encoder corresponding to the driver with respect to the control processing is specified using at least the first identification information. When the encoder corresponding to the driver is specified, the communication state can be changed from the predetermined communication state to the communication state for the control processing using the encoder detection, so that the driver can recognize and communicate with the encoder corresponding to the driver itself through the communication path associated with the predetermined communication state.

At this point, a more specific aspect of the encoder specifying method will be exemplified. First, in the above method, in the second step, the first identification information for identifying the encoder may be transmitted from the encoder to the driver through the power line, and in the third step, the driver may specify that the encoder identified by the first identification information corresponds to the driver based on the first identification information. According to this aspect, the driver can identify the encoder of the motor connected by the power line using the first identification information. The power line physically connects the motor and the driver, so that the first identification information sent through the power line can provide a suitable association between the driver and the encoder.

In the second step, the encoder may transmit the first identification information for identifying the encoder from the encoder to the driver through each of the power line and a communication path associated with the predetermined communication state, and in the third step, the driver may specify that the encoder identified by the first identification information corresponds to the driver based on a comparison result between two pieces of the first identification information transmitted through the power line and the communication path. According to this aspect, the first identification information is transmitted from the encoder to the driver through the communication path associated with the predetermined communication state in addition to the power line. Accordingly, the driver has two pieces of first identification information. At this point, when the two pieces of first identification information are the same, the encoder of the motor that can communicate through the communication path and the encoder of the motor physically connected to the driver through the power line can be determined to be the same with high accuracy. Thus, the driver can suitably specify the encoder that is the communication target for performing the control processing through the communication path.

In the second step, the first identification information for identifying the driver may be transmitted from the driver to the encoder through the power line, and the second identification information for identifying the encoder together with the first identification information may be sent back from the encoder to the driver through a communication path associated with the predetermined communication state, and in the third step, the driver may specify that the encoder identified by the sent-back second identification information corresponds to the driver based on a comparison result between the sent-back first identification information and own identification information owned by the driver. According to this aspect, first, the first identification information is sent to the encoder through the power line, and the encoder sends back the received first identification information and the second identification information about itself to the driver through the communication path. Accordingly, the driver receives the first identification information again through the encoder. At this point, when the first identification information received from the encoder is the same as the own identification information held by the driver, the encoder of the motor that can communicate through the communication path and the encoder of the motor physically connected to the driver through the power line can be determined to be the same with high accuracy. Thus, the driver can suitably specify the encoder that becomes the communication target for performing the control processing through the communication path using the second identification information.

The encoder specifying method may further include: a fourth step of transmitting driver identification information for identifying the driver from the driver to the encoder through the power line or a communication path associated with the predetermined communication state after the specification processing in the third step is performed; and a fifth step of specifying, in the encoder, that the driver corresponds to the encoder based on the driver identification information. With this configuration, the encoder can also specify the driver corresponding to the encoder for the control processing.

The present invention can be grasped from a side of the driver. The driver that performs control processing of a motor by using detection from an encoder attached to the motor being able to transmit and receive a signal between the encoder and a winding, the driver includes: a communication unit configured to transmit or receive first identification information for identifying a transmission side of the driver and the motor between the driver and the motor through a power line connecting the driver and the motor in a predetermined communication state in which the driver is communicable with the encoder; and a specification unit configured to specify the encoder corresponding to the driver with respect to the control processing using at least the first identification information. The technical idea disclosed in the above encoder specifying method of the present application can also be applied to the above driver as long as no technical inconsistency is generated.

The control processing using the encoder detection can be started in the state where the driver can communicate with the encoder before the specification.

DETAILED DESCRIPTION

Embodiment 1

Figure 1:
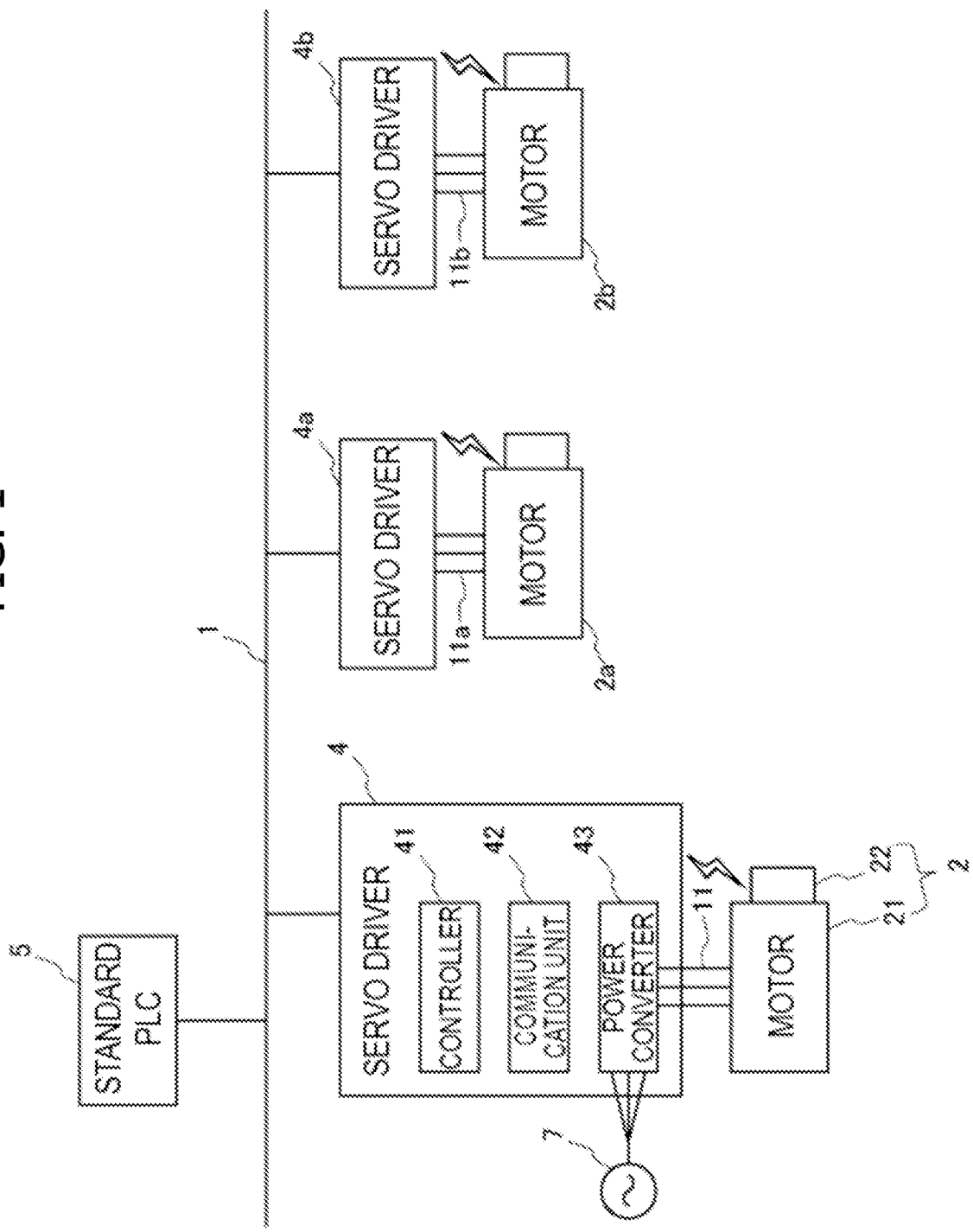
FIG. 1 is a view illustrating a schematic configuration of a control system that drives and controls a motor.

FIG. 1 is a view illustrating a schematic configuration of a control system that drives and controls a motor. First, a control system will be described. In the control system, a standard programmable logic controller (PLC) 5 is connected to a network 1 as a host controller. A plurality of servo drivers 4 are connected to the network 1, and are configured to be able to exchange a signal with the standard PLC 5. Although a functional configuration of one servo driver 4 is representatively described in detail in FIG. 1, other servo drivers 4a, 4b also have the same functional configuration as the servo driver 4. Furthermore, a motor 2 is connected to the servo driver 4 by a power line 11, and supplied with drive power. Similarly, the motors 2a, 2b are supplied with the drive power from the servo drivers 4a, 4b through power lines 11a, 11b, respectively. Hereinafter, structures of the motor and the servo driver will be representatively described based on the motor 2 and the servo driver 4.

At this point, the motor 2 is driven and controlled according to an instruction from the standard PLC 5 in order to drive a predetermined load device. As an example, various mechanical devices (for example, an arm of an industrial robot or a conveyance device) can be exemplified as the load device, and the motor 2 is incorporated in the device as an actuator that drives the load device. The motor 2 is an AC servomotor. Alternatively, the motor 2 may be an induction motor or a DC motor. The motor 2 includes a motor body 21 including a stator including a winding unit formed by winding a coil around a stator core and a rotor in which a permanent magnet is incorporated, and an encoder 22 including a detection disk that rotates in conjunction with rotation of the rotor and capable of detecting a rotation state of the rotor. The rotation detection by the encoder 22 may be an incremental type or an absolute type.

The detection signal from the encoder 22 is wirelessly transmitted to the servo driver 4 through a communication unit 42 included in the servo driver 4 described later. The transmitted detection signal is used for servo control in a later-described controller 41 included in the servo driver 4. For example, the detection signal by the encoder 22 includes position information about a rotation position (angle) of a rotation shaft of the motor 2, information about a rotation speed of the rotation shaft, and the like.

The servo driver 4 includes a controller 41, a communication unit 42, and a power converter 43. The controller 41 is a functional unit that performs servo control of the motor 2 based on an instruction from the standard PLC 5. The controller 41 receives an operation command signal related to the operation (motion) of the motor 2 from the standard PLC 5 through the network 1 and the detection signal output from the encoder 22, and calculates the servo control related to the drive of the motor 2, namely, an instruction value related to the operation of the motor 2. The controller 41 executes feedback control or the like using a position controller, a speed controller, and a current controller. The controller 41 is also configured to perform control other than the servo control of the motor 2, the control being performed by the servo driver 4.

The communication unit 42 is a functional unit that performs wireless communication between the encoder 22 and the servo driver 4. When starting the wireless communication, the communication unit 42 of the servo driver 4 specifies that the encoder 22 is a wireless communication target by a processing for specifying the encoder that is the own communication target. Accordingly, after the encoder specifying processing is performed, the communication unit 42 does not perform the wireless communication by line mixing with the encoder of the motor 2a or the encoder of the motor 2b. Similarly, the encoder of the motor 2a and the encoder of the motor 2b perform the wireless communication only with the servo drivers 4a, 4b, respectively. The power converter 43 supplies the drive power to the motor 2 through the power line 11 based on the instruction value related to the operation of the motor 2 calculated by the controller 41. AC power transmitted from an AC power supply 7 to the servo driver 4 is used to generate the supply power. In the embodiment, the servo driver 4 is of a type that receives three-phase alternating current, but may be of a type that receives single-phase alternating current.

Figure 2:
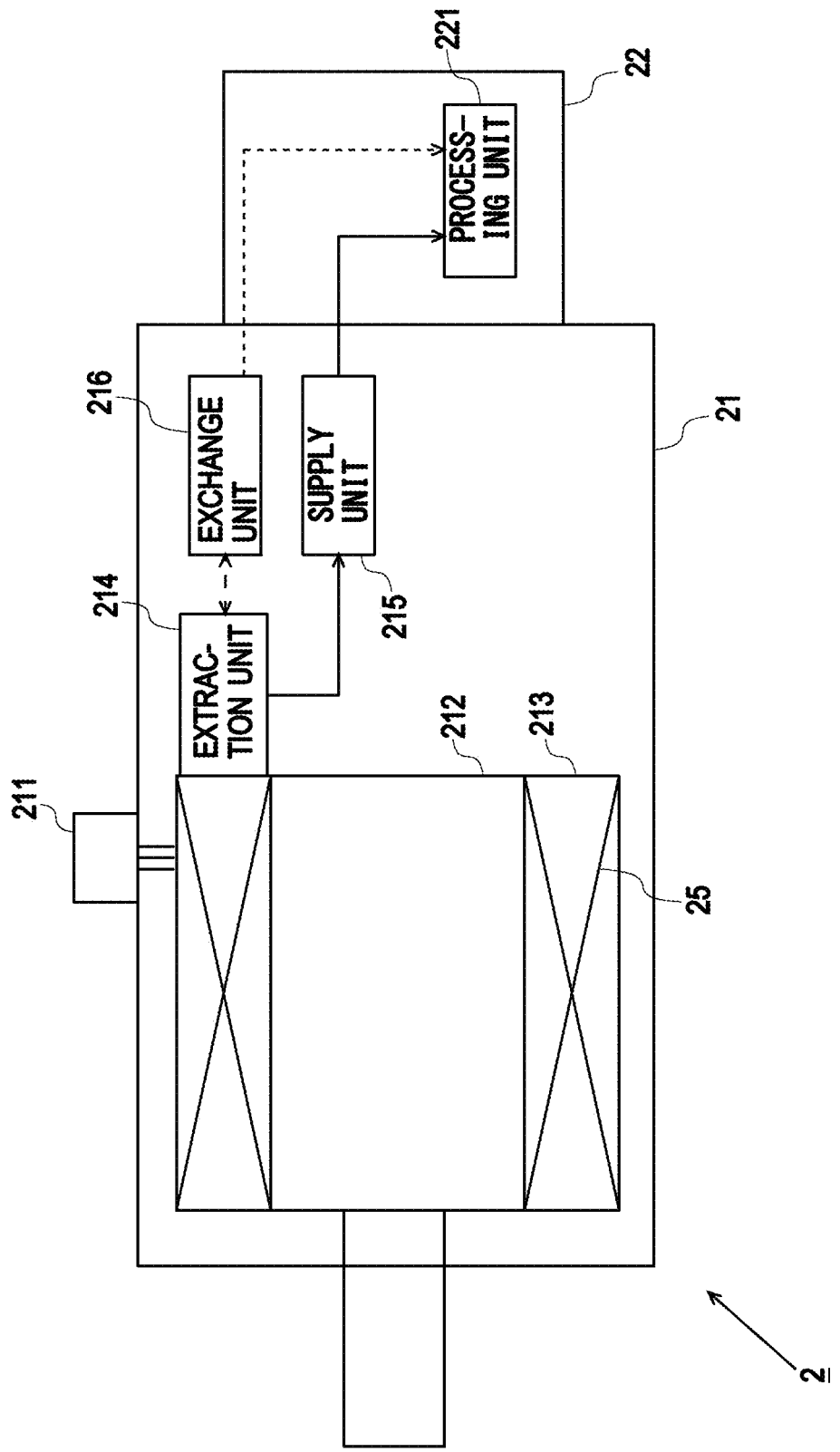
FIG. 2 is a view illustrating a schematic configuration of the motor.

With reference to FIG. 2, a schematic configuration of the motor 2 will be described below. The motor 2 is a three-phase (U-phase, V-phase, W-phase) AC motor, and includes a motor body 21 and an encoder 22. The motor body 21 includes a rotor 212 and a stator 213. A permanent magnet is incorporated in the rotor 212 and is rotatably supported. In the stator 213, the coil is wound around the stator core formed of an electromagnetic steel plate to form a winding unit 25. In the embodiment, the connection state of each phase in the winding unit 25 is Y connection, but delta connection may be used instead. In the embodiment, a winding method of the coil around the stator core may be either distributed winding or concentrated winding. The configuration in FIG. 2 is merely schematic, and the technical idea of the present invention can be applied regardless of the specific configuration of the motor.

Figure 3:
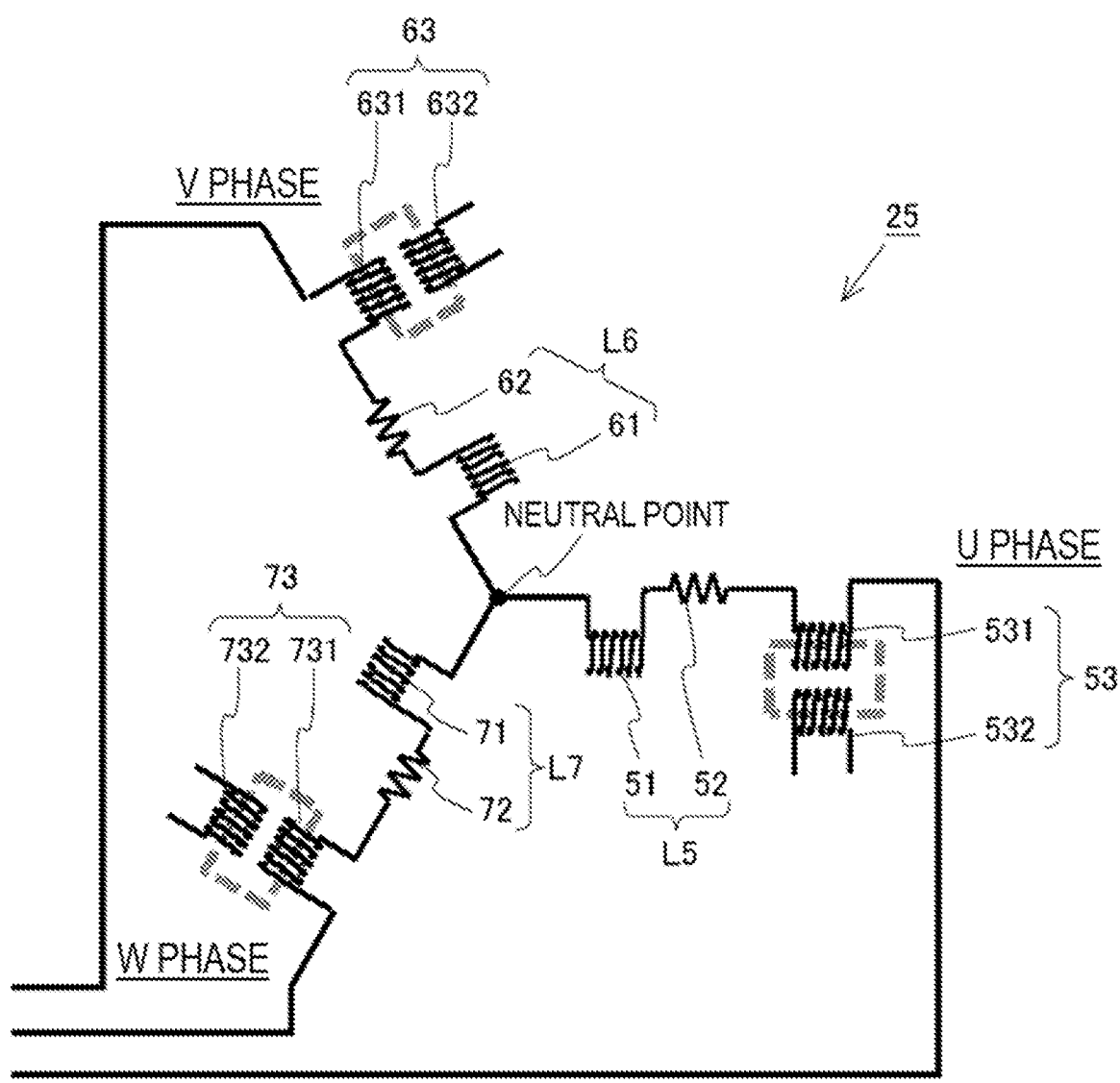
FIG. 3 is a view schematically illustrating a winding unit of the motor and a disposition of a transformer structure provided for the winding unit.

The power line 11 through which the drive power is supplied from the servo driver 4 is connected to a connector 211. The connector 211 is connected to each phase of the winding unit 25. In the motor 2, a predetermined transformer structure (see 53, 63, 73 in FIG. 3, details will be described later) is disposed with respect to the winding unit 25, and an extraction unit 214 that extracts a part of the drive power supplied to the coil of the winding unit 25 as the power of the encoder using the transformer structure is provided. That is, the extraction unit 214 applies the AC power to the primary coil side of the transformer structure together with the winding unit 25 of the motor body 21, thereby extracting a current that can be used as a drive current of the encoder 22 on the secondary coil side. In the mode of FIG. 3, for example, the transformer structure is formed for the winding unit 25 located at the coil end of the stator 213, but the transformer structure may be formed in other modes.

The extraction unit 214 extracts the power output from the secondary coil having the transformer structure as the power for the encoder 22. The power is rectified by a supply unit 215, and converted into a DC voltage suitable for driving the encoder 22 by a DC-DC converter included in the supply unit 215 as necessary. In the state where the encoder 22 is attached to the motor body 21, the supply unit 215 is electrically connected to the encoder 22 so as to be able to supply DC power to a side of the encoder 22, particularly to a processing unit 221 that performs detection processing of the rotation of the rotor 212. The supply unit 215 may include a secondary battery that can store the rectified DC power. In this case, the power can be supplied to the encoder 22 even in a period in which the drive current does not flow in the winding unit or a period in which the drive current is extremely low.

Furthermore, the motor 2 of the embodiment is configured to be able to transmit and receive a predetermined signal between the winding unit 25 of the motor body 21 and the processing unit 221 of the encoder 22 using the extraction processing by the extraction unit 214. The predetermined signal is transmitted and received by a signal exchange unit 216 using the above-described transformer structure. When the predetermined signal is sent from the winding unit 25 to the processing unit 221, the AC power obtained by superimposing the predetermined signal on the coil of the winding unit 25 is given to the primary coil side having the transformer structure, whereby the extraction unit 214 can generate the current corresponding to the predetermined signal on the secondary coil side having the transformer structure. Then, the extracted corresponding current is passed to the processing unit 221 by the signal exchange unit 216. In this case, in order to accurately transmit the information of the predetermined signal, the signal exchange unit 216 does not perform rectification processing on the corresponding current extracted by the extraction unit 214. On the other hand, when the extracted corresponding current is weak, the signal exchange unit 216 may perform predetermined amplification processing.

In addition, when the predetermined signal is sent from the processing unit 221 to the winding unit 25, the AC power including the predetermined signal is given to the secondary coil side of the transformer structure through the signal exchange unit 216, so that the extraction unit 214 generates the current corresponding to the predetermined signal on the primary coil side having the transformer structure, and the current can be caused to flow through the coil of the winding unit 25. Also in this case, the predetermined amplification processing may be performed on the predetermined signal by the signal exchange unit 216. The coil of the winding unit 25 is electrically connected to the servo driver 4 through the power line 11, so that the predetermined signal can be transmitted from the encoder 22 to the servo driver 4 through the AC power corresponding to the predetermined signal output from the processing unit 221. As described above, the encoder 22 and the servo driver 4 are configured to enable the wireless communication through the communication unit 42, but the transmission and reception of the predetermined signal through the signal exchange unit 216 are a communication form useful under a certain condition such as a state before the wireless communication is enabled.

With reference to FIG. 3, a disposition example of the winding unit 25 of the motor body 21 and the transformer structure provided for the winding unit will be described below. The winding unit 25 includes three-phase winding portions L5, L6, L7 of a U phase, a V phase, and a W phase. The connection state of the winding portion of each phase is Y connection, and a joining place of each winding portion is a neutral point. An inductance component of the U-phase winding portion L5 is referenced by a numeral 51 and a resistance component of the U-phase winding portion L5 is referenced by a numeral 52 in FIG. 3. Similarly, an inductance component of the V-phase winding portion L6 is referenced by a numeral 61 and a resistance component of the V-phase winding portion L6 is referenced by a numeral 62, and an inductance component of the W-phase winding portion L7 is referenced by a numeral 71 and a resistance component of the W-phase winding portion L7 is referenced by a numeral 72.

The transformer structure forming the extraction unit 214 is disposed in each phase. Specifically, a primary coil 531 of the U-phase transformer structure 53 is connected in series to the winding portion L5 in the U phase, a primary coil 631 of the V-phase transformer structure 63 is connected in series to the winding portion L6 in the V phase, and a primary coil 731 of the W-phase transformer structure 73 is connected in series to the winding portion L7 in the W phase. A secondary coil 532 of the U-phase transformer structure 53, a secondary coil 632 of the V-phase transformer structure 63, and a secondary coil 732 of the W-phase transformer structure 73 are connected to the supply unit 215. Furthermore, each of the secondary coils 532, 632, 732 is also connected to the signal exchange unit 216.

The winding ratio of the transformer structure of each phase (the ratio of the number of windings of the secondary coil to the number of windings of the primary coil) is basically the same, but may be different. In the mode of FIG. 3, the transformer structure is disposed in all the three phases, and the secondary coil is connected to the supply unit 215 and the signal exchange unit 216. However, the transformer structure may be disposed only in some of the three phases, and the secondary coil may be connected to the supply unit 215 and the signal exchange unit 216. Alternatively, the transformer structure may be disposed in all the three phases, some secondary coils having the transformer structure may be connected to the supply unit 215, and the remaining secondary coils having the transformer structure may be connected to the signal exchange unit 216. In this case, the winding ratio of the transformer structure connected to the supply unit 215 and responsible for the power supply to the encoder 22 and the winding ratio of the transformer structure connected to the signal exchange unit 216 and responsible for the transmission and reception of the predetermined signal with the encoder 22 may be suitably set according to each purpose.

By adopting the winding unit 25 and the transformer structures 53, 63, 73 configured as described above, a part of the power supplied to the motor 2 through the power line 11 can be extracted as the drive power of the encoder 22 by the extraction unit 214. According to this configuration, when the motor 2 is driven, the power of the encoder 22 is also stably supplied at all times, and a cable to be wired to the encoder 22 is not required for this purpose, so that the wiring work of the cable is greatly reduced and the cost thereof can be suppressed. In the first mode, the transformer structure of each phase is preferably disposed using the coil end of the stator 213.

<Encoder Specifying Processing by Servo Driver 4>

The processing related to the specification of the combination of the communication unit 42 of the servo driver 4 and the encoder 22 corresponding to the communication unit 42, namely, the processing related to the specification of the encoder serving as a wireless communication target by the servo driver 4 will be described with reference to FIG. 4. As described above, before the specification processing is performed, each of the servo drivers 4, 4a, 4b is placed in the state (corresponding to the predetermined communication state of the present invention) in which the wireless communication can be performed with (the encoder of) the unspecified motor 2, 2a, 2b, in other words, each of the servo drivers 4, 4a, 4b is not placed in the state in which the wireless communication can be performed with (the encoder of) the specified motor for the servo control of the specified motor. For this reason, the servo driver 4 and the encoder 22 cannot transmit and receive the signal for the servo control, and thus cannot execute the servo control of the motor 2. Accordingly, the specification processing can be said to be preprocessing required for actually operating the control system in FIG. 1. The specification processing is implemented by transmitting and receiving the predetermined signal through the signal exchange unit 216 between the winding unit 25 of the motor body 21 and the processing unit 221 of the encoder 22 using the extraction processing by the extraction unit 214.

<First Aspect>

A first mode of the specification processing of the encoder 22 will be described with reference to FIG. 4. A step of connecting the servo driver 4 and the motor 2 by the power line 11 is provided before the processing in FIG. 4. Subsequently, in S101, encoder identification information that is information for being able to identify the encoder 22 is transmitted from the processing unit 221 of the encoder 22 to the servo driver 4. The encoder identification information is transmitted through the signal exchange unit 216 and the power line 11 connecting the motor 2 and the servo driver 4. In step S102, the controller 41 of the servo driver 4 receives the encoder identification information transmitted from the encoder 22. Subsequently, in S103, the controller 41 specifies the encoder (hereinafter, also referred to as a "corresponding encoder") corresponding to the own servo driver 4 based on the encoder identification information received in S102. The power line 11 is a cable physically connecting the actual motor 2 to the servo driver 4, so that the corresponding encoder of the servo driver 4 can be specified as the encoder 22 based on first identification information transmitted through the power line 11 in the embodiment. In other words, the corresponding encoder of the servo driver 4 is not specified as the encoder of the motor 2a or the encoder of the motor 2b.

When the processing for specifying the corresponding encoder is completed, in step S104, driver identification information that is information for being able to wirelessly identify the servo driver 4 is transmitted from the servo driver 4 to the encoder 22 specified as the corresponding encoder. The driver identification information transmission processing is performed through the communication unit 42. Because the corresponding encoder is specified to the encoder 22 in S103, the driver identification information can be suitably wirelessly transmitted to the encoder 22 through the communication unit 42. In S105, the encoder 22 receives the driver identification information. Subsequently, in S106, the encoder 22 specifies that the servo driver corresponding to the encoder 22 is the servo driver 4 based on the received driver identification information.

Through the above pieces of processing of S101 to S106, the communication partner specifying processing for the servo control is performed between the servo driver 4 and the encoder 22 of the motor 2. Thus, the servo driver 4 and the encoder 22 of the motor 2 can wirelessly communicate with the encoder of the specific motor for the servo control of the specific motor from the state corresponding to a predetermined communication state of the present invention. As a result, the servo control of the motor 2 can be executed while the encoder 22 and the communication unit 42 perform the wireless communication. The transmission of the driver identification information in S104 may be performed through the power line 11 instead of being performed wirelessly.

<Second Aspect>

A second mode of the specification processing of the encoder 22 will be described with reference to FIG. 5. A step of connecting the servo driver 4 and the motor 2 by the power line 11 is provided before the processing in FIG. 5. Then, in S201, encoder identification information that is information for being able to identify the encoder 22 is transmitted from the processing unit 221 of the encoder 22 to the servo driver 4. The encoder identification information is transmitted through the signal exchange unit 216 and the power line 11 connecting the motor 2 and the servo driver 4. In step S202, the controller 41 of the servo driver 4 receives the encoder identification information transmitted from the encoder 22.

Subsequently, in S203, the same encoder identification information as the above-described encoder identification information is transmitted from the processing unit 221 of the encoder 22 to the servo driver 4. The encoder identification information is transmitted through the wireless communication. However, the wireless communication at this time point is the state in which the communication partner specifying processing is not yet performed between the servo driver 4 and the encoder 22. For this reason, the encoder identification information transmitted in S203 is received by the controller 41 through the communication unit 42 of the servo driver 4 in S204. Similarly, the servo drivers 4a, 4b also receive the encoder identification information.

Then, in S205, the controller 41 compares the two pieces of encoder identification information. Because the servo driver 4 is connected to the motor 2 through the power line 11, the servo driver 4 receives the encoder identification information in S202 and also receives the encoder identification information in S204. Thus, in S205, the servo driver 4 can determine that the two pieces of encoder identification information is matched with each other. As a result, the corresponding encoder of the own servo driver 4 is specified in S206. By comparing the encoder identification information obtained through the power line with the encoder identification information obtained wirelessly, the encoder serving as the counterpart of the wireless communication can be specified as the encoder of the motor 2 physically connected by the power line 11. In other words, the corresponding encoder of the servo driver 4 is not specified as the encoder of the motor 2a or the encoder of the motor 2b. In other servo drivers 4a, 4b, the encoder identification information received through each power line is not matched with the encoder identification information received wirelessly from the motor 2. Accordingly, the corresponding encoders of the servo drivers 4a, 4b are not specified as the encoder 22 of the motor 2.

When the processing for specifying the corresponding encoder is completed, the servo driver 4 transmits the driver identification information that is information for being able to identify the servo driver 4 through the power line 11, to the encoder 22 specified as the corresponding encoder in S207. The processing for transmitting the driver identification information is performed from the controller 41 through the signal exchange unit 216 in the motor 2. In S208, the encoder 22 receives the driver identification information.

Subsequently, in S209, the encoder 22 specifies that the servo driver corresponding to itself is the servo driver 4 based on the received driver identification information.

Through the pieces of processing of S201 to S209, the communication partner specifying processing for the servo control is performed between the servo driver 4 and the encoder 22 of the motor 2. Thus, the servo driver 4 and the encoder 22 of the motor 2 can wirelessly communicate with the encoder of the specific motor for the servo control of the specific motor from the state corresponding to a predetermined communication state of the present invention. As a result, the servo control of the motor 2 can be executed while the encoder 22 and the communication unit 42 perform the wireless communication. The transmission of the driver identification information in S207 may be performed wirelessly instead of through the power line 11.

<Third Aspect>

A third mode of the specification processing of the encoder 22 will be described with reference to FIG. 6. A step of connecting the servo driver 4 and the motor 2 by the power line 11 is provided before the processing in FIG. 6. In step S301, the controller 11 of the servo driver 4 transmits the driver identification information that is information for being able to identify the servo driver 4 to the encoder 22 of the motor 2. The driver identification information is transmitted through the power line 11 connecting the motor 2 and the servo driver 4 and the signal exchange unit 216. In step S302, the processing unit 221 of the encoder 22 receives the driver identification information transmitted from the servo driver 4.

Subsequently, in S303, the processing unit 221 of the encoder 22 transmits the encoder identification information that is information for being able to identify the encoder 22 together with the received driver identification information to the servo driver 4. These pieces of identification information are transmitted through the wireless communication. However, the wireless communication at this time point is the state in which the communication partner specifying processing is not yet performed between the servo driver 4 and the encoder 22. Therefore, the driver identification information and the encoder identification information transmitted in S303 are received by the controller 41 through the communication unit 42 of the servo driver 4 in S304. Similarly, the servo drivers 4a, 4b also receive these two pieces of identification information.

Subsequently, in S305, the controller 41 compares and collates the driver identification information included in the two pieces of identification information with the own identification information held by the servo driver 4 itself. As a result of the comparison, when the received driver identification information is matched with the held identification information, the corresponding encoder of the own servo driver 4 is specified in S306. The encoder serving as the counterpart of the wireless communication can be specified as the encoder of the motor 2 physically connected by the power line 11 using the driver identification information sent back from the encoder 22 of the motor 2 physically connected through the power line in this manner. In other words, the corresponding encoder of the servo driver 4 is not specified as the encoder of the motor 2a or the encoder of the motor 2b. Because the wirelessly-received driver identification information is not matched with the own identification information about the servo drivers 4a, 4b, the corresponding encoders of the servo drivers 4a, 4b are not identified as the encoder 22 of the motor 2.

Furthermore, when the processing for specifying the corresponding encoder is completed, the servo driver 4 notifies the encoder 22 specified as the corresponding encoder that the processing for specifying the corresponding encoder is completed through the power line 11 in S307. The processing unit 221 of the encoder 22 that receives the notification specifies that the servo driver corresponding to the encoder itself is the servo driver 4 using the driver identification information received in S302 (processing in S308).

Through the pieces of processing of S301 to S308, the communication partner specifying processing for the servo control is performed between the servo driver 4 and the encoder 22 of the motor 2. Thus, the servo driver 4 and the encoder 22 of the motor 2 can wirelessly communicate with the encoder of the specific motor for the servo control of the specific motor from the state corresponding to a predetermined communication state of the present invention. As a result, the servo control of the motor 2 can be executed while the encoder 22 and the communication unit 42 perform the wireless communication. The notification of the completion of specification in S307 may be performed wirelessly instead of through the power line 11.

OTHER EMBODIMENTS

Figure 4:
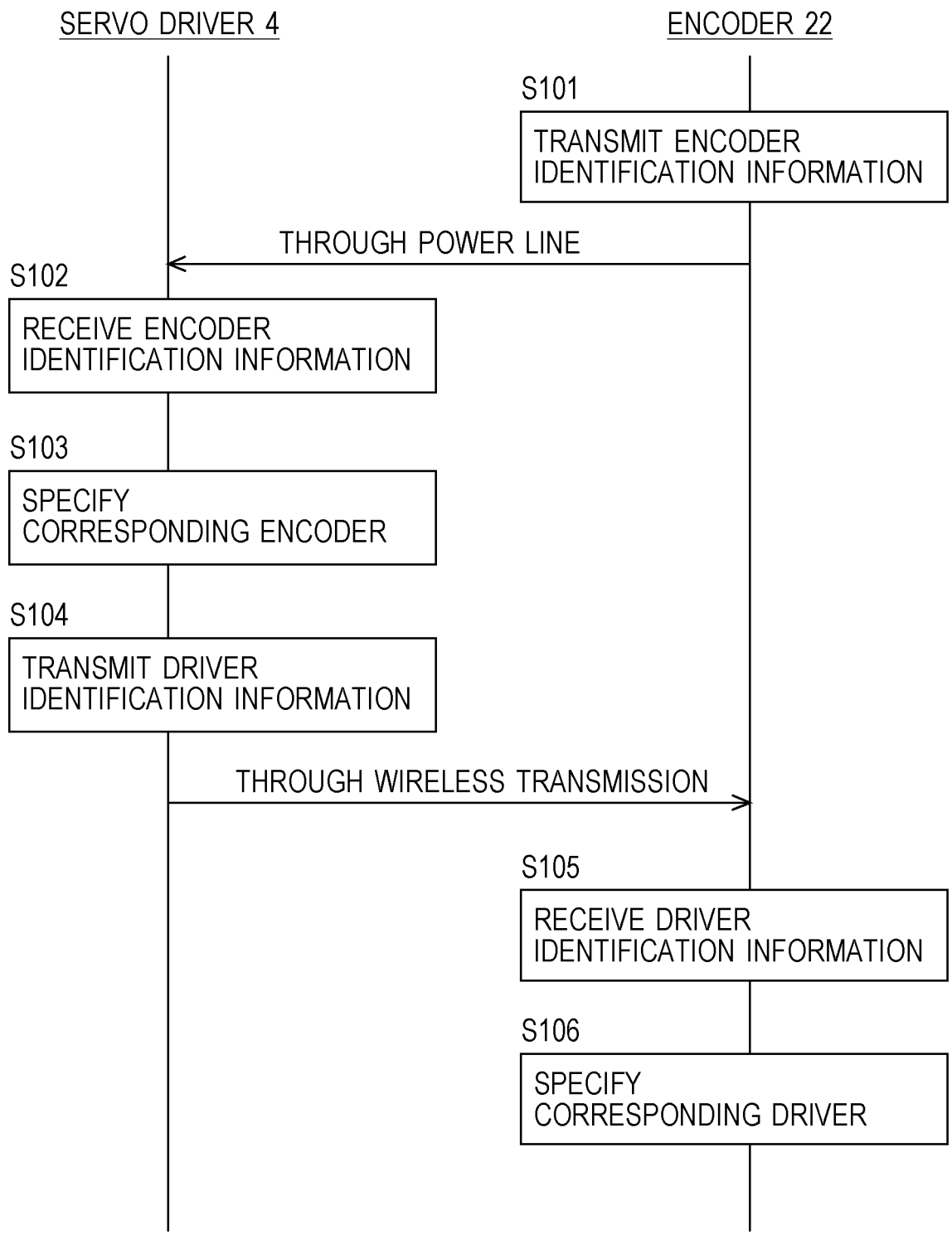
FIG. 4 is a first flowchart illustrating control of a driver specifying an encoder corresponding to a driver.
Figure 5:
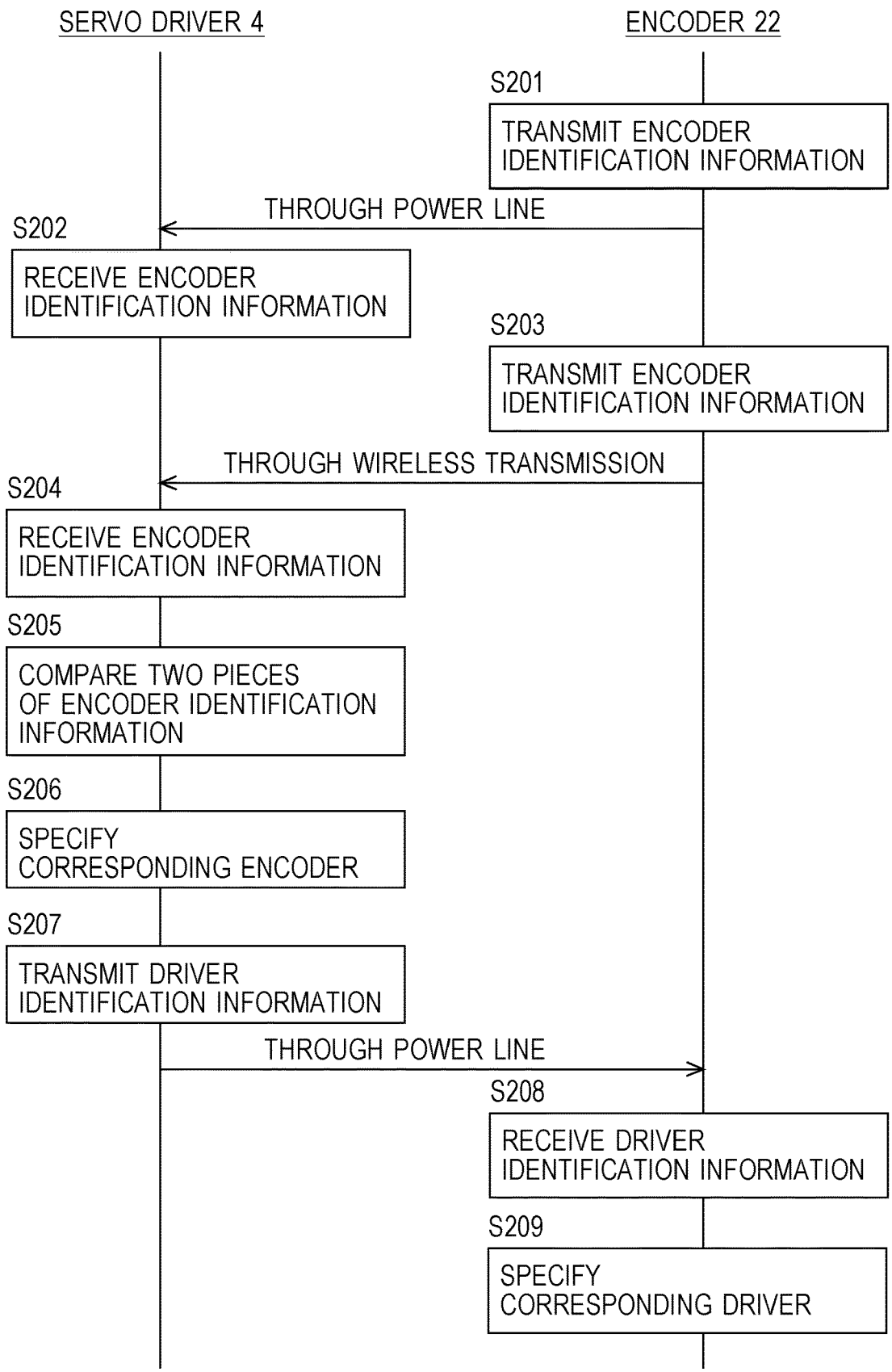
FIG. 5 is a second flowchart illustrating the control of the driver specifying the encoder corresponding to the driver.
Figure 6:
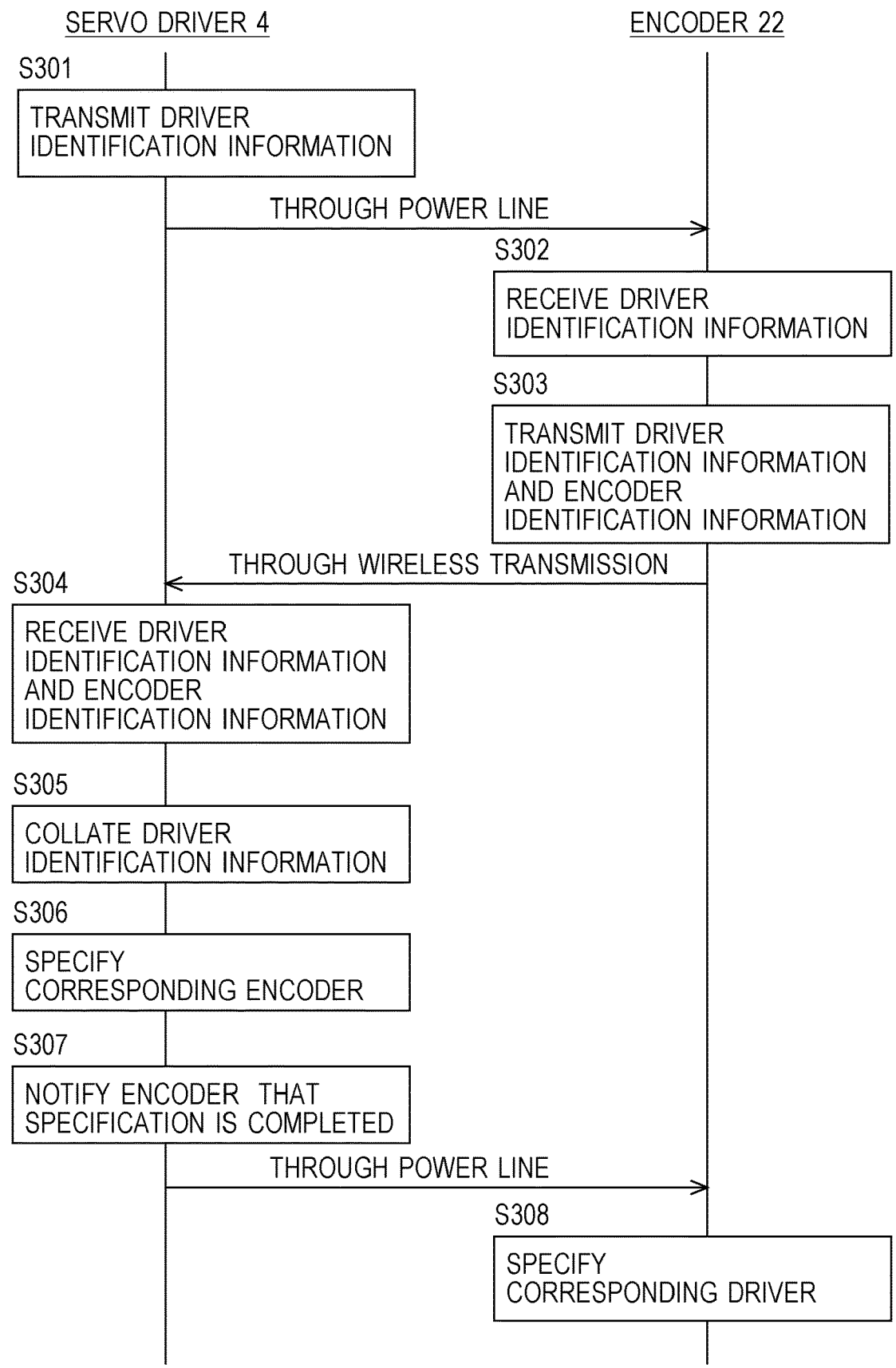
FIG. 6 is a third flowchart illustrating the control of the driver specifying the encoder corresponding to the driver.

In the control system described above, the encoder of each motor and the servo driver corresponding thereto perform the wireless communication, so that the servo control of each motor is implemented, and the specification processing in FIGS. 4 to 6 can be applied to enable the wireless communication for the servo control. At this point, the specification processing in FIGS. 4 to 6 can also be applied to a system in which the standard PLC 5, the drivers 4, 4a, 4b, and the encoders of the motors perform the communication in the daisy-chain connected state by EtherCAT (registered trademark) instead of the control system described above. This is because even in such a system, before the encoder of the specific motor corresponding to the driver is specified, the driver is in the state of being able to communicate with an unspecified encoder through EtherCAT. Consequently, in the control system daisy-chain connected by EtherCAT, the servo driver 4 and the encoder 22 of the motor 2 are brought from the state corresponding to the predetermined communication state of the present application to the state in which the encoder of the specific motor can be wirelessly communicated for the servo control of the specific motor by applying substantially the same processing as the specific processing in FIG. 4.

<Supplement 1>

A method for specifying an encoder (22) attached to a motor (2) that is a target of control processing by a driver (4) in a predetermined communication state in which the driver (4) and the encoder (22) are communicable, the motor (2) being able to transmit and receive a signal between the encoder (22) and a winding of the motor (2), the method including: a first step of connecting the driver (4) and the motor (2) by a power line (11); a second step of transmitting first identification information for identifying a transmission side in the driver (4) and the motor (2) from the transmission side to a reception side through the power line between the driver (4) and the motor (2) connected by the power line (11); and a third step of specifying the encoder (22) corresponding to the driver (4) with respect to the control processing using at least the first identification information.

<Supplement 2>

A driver (4) that performs control processing of a motor (2) by using detection from an encoder (22) attached to the motor (2) being able to transmit and receive a signal between the encoder (22) and a winding, the driver (4) comprising:
- a communication unit (42) configured to transmit or receive first identification information for identifying a transmission side of the driver (4) and the motor (2) between the driver (4) and the motor (2) through a power line connecting the driver (4) and the motor (2) in a predetermined communication state in which the driver (4) is communicable with the encoder; and
- a specification unit (41) configured to specify the encoder (22) corresponding to the driver (4) with respect to the control processing using at least the first identification information.

DESCRIPTION OF SYMBOLS 2 motor
4 servo driver
22 encoder
53, 63, 73 transformer structure
211 connector (power input unit)
214 extraction unit
251 supply unit

The invention claimed is:

1. A method for specifying an encoder attached to a motor that is a target of control processing by a driver in a predetermined communication state in which the driver and the encoder are communicable,
the motor being able to transmit and receive a signal between the encoder and a winding of the motor,
the method comprising:
- a first step of connecting the driver and the motor by a power line;
- a second step of transmitting first identification information for identifying a transmission side in the driver and the motor from the transmission side to a reception side through the power line between the driver and the motor connected by the power line; and
- a third step of specifying the encoder corresponding to the driver with respect to the control processing using at least the first identification information,
- wherein in the second step, the encoder transmits the first identification information for identifying the encoder from the encoder to the driver through each of the power line and a communication path associated with the predetermined communication state, and
- in the third step, the driver specifies that the encoder identified by the first identification information corresponds to the driver based on a comparison result between two pieces of the first identification information transmitted through the power line and the communication path.

2. The encoder specifying method according to claim 1, further comprising:
- a fourth step of transmitting driver identification information for identifying the driver from the driver to the encoder through the power line or a communication path associated with the predetermined communication state after the specification processing in the third step is performed; and
- a fifth step of specifying, in the encoder, that the driver corresponds to the encoder based on the driver identification information.

3. The encoder specifying method according to claim 1, wherein the predetermined communication state is a communication state by wireless communication or a communication state formed by daisy-chain connection of the driver and the encoder.

4. A method for specifying an encoder attached to a motor that is a target of control processing by a driver in a predetermined communication state in which the driver and the encoder are communicable,
the motor being able to transmit and receive a signal between the encoder and a winding of the motor
the method comprising:
- a first step of connecting the driver and the motor by a power line;
- a second step of transmitting first identification information for identifying a transmission side in the driver and the motor from the transmission side to a reception side through the power line between the driver and the motor connected by the power line; and
- a third step of specifying the encoder corresponding to the driver with respect to the control processing using at least the first identification information,
- wherein in the second step, the first identification information for identifying the driver is transmitted from the driver to the encoder through the power line, and the second identification information for identifying the encoder together with the first identification information is sent back from the encoder to the driver through a communication path associated with the predetermined communication state, and
- in the third step, the driver specifies that the encoder identified by the sent-back second identification information corresponds to the driver based on a comparison result between the sent-back first identification information and own identification information owned by the driver.

5. A driver that performs control processing of a motor by using detection from an encoder attached to the motor being able to transmit and receive a signal between the encoder and a winding, the driver comprising:
- a communication unit configured to transmit or receive first identification information for identifying a transmission side of the driver and the motor between the driver and the motor through a power line connecting the driver and the motor in a predetermined communication state in which the driver is communicable with the encoder; and
- a controller configured to specify the encoder corresponding to the driver with respect to the control processing using at least the first identification information,
- wherein the communication unit receives the first identification information for identifying the encoder from the encoder to the driver through each of the power line and the communication path associated with the predetermined communication state, and
- the controller specifies that the encoder identified by the first identification information corresponds to the driver based on a comparison result between two pieces of the first identification information transmitted through the power line and the communication path.

6. The driver according to claim 5, wherein the predetermined communication state is a communication state by wireless communication or a communication state formed by daisy-chain connection of the driver and the encoder.

7. A driver that performs control processing of a motor by using detection from an encoder attached to the motor being able to transmit and receive a signal between the encoder and a winding, the driver comprising:

a communication unit configured to transmit or receive first identification information for identifying a transmission side of the driver and the motor between the driver and the motor through a power line connecting the driver and the motor in a predetermined communication state in which the driver is communicable with the encoder; and a controller configured to specify the encoder corresponding to the driver with respect to the control processing using at least the first identification information, wherein the communication unit transmits the first identification information for identifying the driver from the driver to the encoder through the power line, and receives second identification information for identifying the encoder together with the first identification information from the encoder through a communication path associated with the predetermined communication state, and the controller specifies that the encoder identified by the received second identification information corresponds to the driver based on a comparison result between the received first identification information and own identification information owned by the driver.

* * * * *